United States Patent [19]

Williams et al.

[11] Patent Number: 5,459,654
[45] Date of Patent: Oct. 17, 1995

[54] APPARATUS FOR GENERATING POSITIVE AND NEGATIVE SUPPLY RAILS FROM OPERATING MOTOR CONTROL CIRCUIT

[75] Inventors: Richard K. Williams, Cupertino; Allen A. Chang, Santa Clara; Barry J. Concklin, San Jose, all of Calif.

[73] Assignee: Siliconix incorporated, Santa Clara, Calif.

[21] Appl. No.: 62,969

[22] Filed: May 14, 1993

[51] Int. Cl.$^6$ ................................................ H02M 7/04
[52] U.S. Cl. .................. 363/98; 363/17; 363/63; 363/132; 318/294; 388/907.2; 327/531; 327/108
[58] Field of Search ................ 363/17, 63, 98, 363/132; 318/138, 254, 293, 294; 388/907.2; 307/270, 296.2

[56] References Cited

U.S. PATENT DOCUMENTS

| | | | |
|---|---|---|---|
| 4,237,501 | 12/1980 | Barmache et al. | 360/75 |
| 4,271,438 | 6/1981 | Cornell | 360/32 |
| 4,409,527 | 10/1983 | Sommeria | 318/341 |
| 4,679,102 | 7/1987 | Wevers et al. | 360/75 |
| 4,710,686 | 12/1987 | Guzik | 318/293 |
| 4,760,324 | 7/1988 | Underhill | 363/63 X |
| 4,812,961 | 3/1989 | Essaff et al. | 363/63 X |
| 4,829,415 | 5/1989 | Haferl | 363/26 |
| 4,901,216 | 2/1990 | Small | 363/98 |
| 4,926,354 | 5/1990 | Pattantyus | 363/98 |
| 4,945,467 | 7/1990 | Bhagwat | 363/132 |
| 5,019,719 | 5/1991 | King | 307/246 |
| 5,119,000 | 6/1992 | Schultz | 318/254 |
| 5,157,592 | 10/1992 | Walters | 363/17 |
| 5,262,704 | 11/1993 | Farr | 318/434 |
| 5,303,101 | 4/1994 | Hatch et al. | 360/105 |
| 5,325,030 | 6/1994 | Yamamura et al. | 318/536 |

*Primary Examiner*—A. D. Pellinen
*Assistant Examiner*—Y. Jessica Han
*Attorney, Agent, or Firm*—Skjerven, Morrill, MacPherson, Franklin & Friel; David E. Steuber

[57] ABSTRACT

A motor control circuit is used to generate positive and negative voltage supply rails. The motor control circuit contains two halfbridges, each of which contains a pair of MOSFETs connected in series, each of the MOSFETs being formed without the customary short between the source and substrate (body). In one embodiment, a common node between the MOSFETs is connected to a positive voltage supply rail, and the body regions of the MOSFETs are connected to a negative voltage supply rail. The positive and negative voltage supply rails are biased by charging respective capacitors, using the positive and negative voltage spikes that appear at the outputs of the motor control circuit as the outputs switch from a low state to a high state, and vice versa.

19 Claims, 5 Drawing Sheets

APPARATUS FOR GENERATING POSITIVE AND NEGATIVE SUPPLY RAILS FROM OPERATING MOTOR CONTROL CIRCUIT

RELATED APPLICATIONS

This application is related to the following applications, each of which is being filed on the same day, and each of which is incorporated herein by reference: U.S. application Ser. No. 08/062,504; U.S. application Ser. No. 08/062,968; U.S. application Ser. No. 08/062,503.

FIELD OF THE INVENTION

This invention relates to motor control circuits and, in particular, to a technique for generating positive and negative voltage supply rails from a motor control circuit.

BACKGROUND OF THE INVENTION

In motor control circuits it is often desirable to include amplifiers and comparators which operate over signal ranges from below ground up to the motor supply voltage ($V_{CC}$), and in some instances even above $V_{CC}$. These so-called "rail-to-rail" circuits are difficult to design and often require a number of design compromises.

One of the most difficult circuit design challenges, for example, is to build an amplifier that operates all the way from rail-to-rail. Amplifiers generally include current sources, which themselves subtract from the voltage available to the amplifier. If a rail below ground is available, however, a wide input range can be achieved without resorting to rail-to-rail construction.

A known method of solving this problem is to provide an additional voltage supply which generates supply rails below ground or above $V_{CC}$. These additional voltage supplies generally add cost and complexity to the circuit because they require the integration of a charge pump or, in some cases, a switching mode power supply and an external inductor.

The present invention overcomes these problems.

SUMMARY OF THE INVENTION

This invention enables supply rails both above $V_{CC}$ and below ground to be provided whenever a motor is present. It relies on the voltage spikes which occur at the inputs to the motor whenever the motor control circuit switches between its high and low states.

In one embodiment, the motor control circuit includes two push-pull "halfbridges", which supply a two-phase motor. Each halfbridge includes two N-channel MOSFETs connected in totem-pole fashion. Both MOSFETs intentionally lack a source-body short. The common node between the MOSFETs, which is connected to an input terminal of the motor, is connected through a diode to a reservoir capacitor which is charged to a positive supply voltage $V_{AUX+}$. The body of each MOSFET (which, as noted, is not shorted to the source nor to ground) is connected to a second reservoir capacitor which stores a negative voltage source $V_{AUX+}$. A Zener diode or other voltage limiting means is connected across each of the reservoir capacitors to limit the voltage across it. A second means ties the bodies of the MOSFETs to ground during start-up so that they do not float and thereby risk turning on the intrinsic bipolar transistors in the MOSFETs.

The arrangement of this invention can be used for motors having any number of phases and can be constructed using P-channel MOSFET technology as well as N-channel MOSFET technology.

DESCRIPTION OF THE INVENTION

Figure 1:
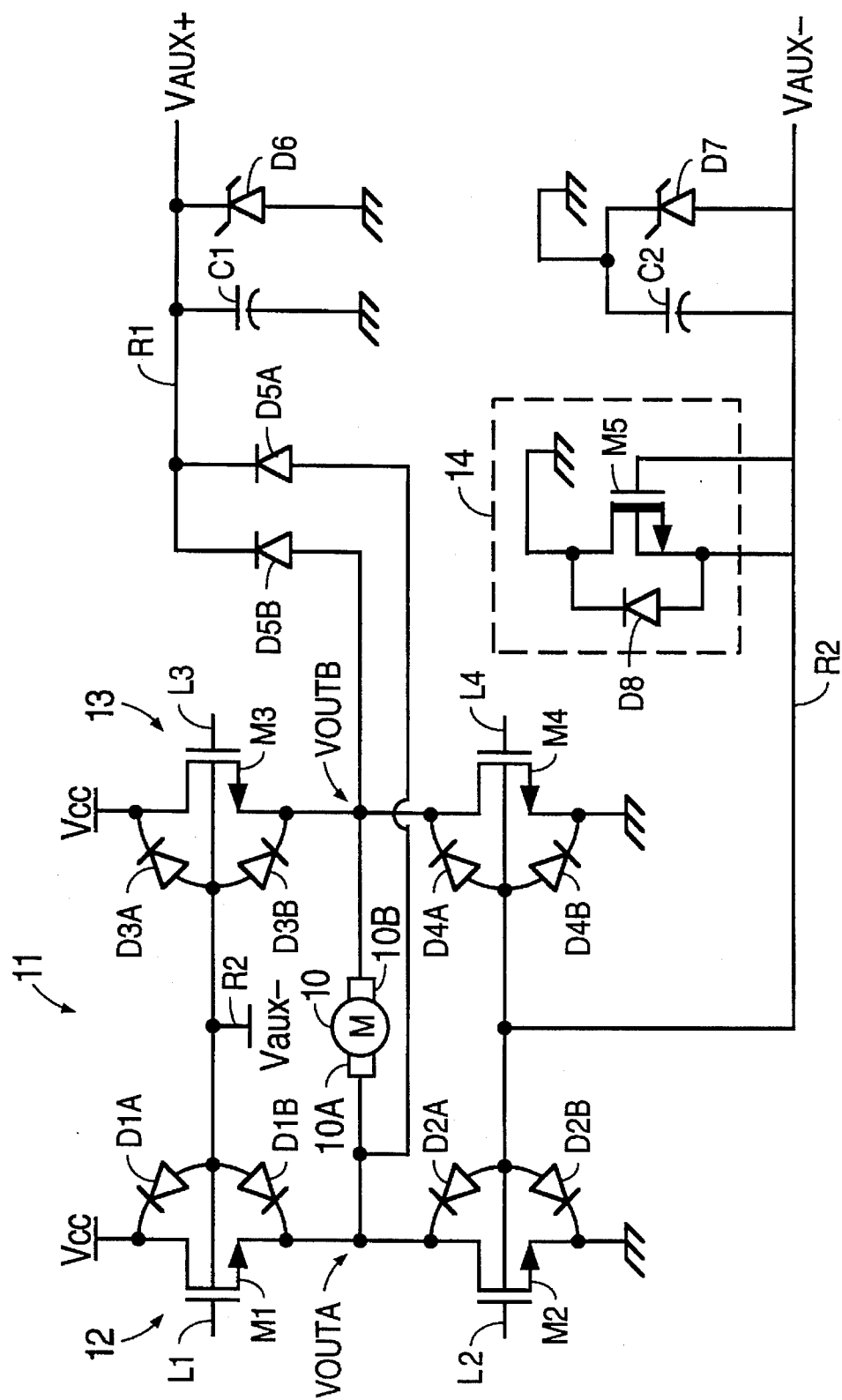
FIG. 1 illustrates an embodiment according to the invention using N-channel MOSFET technology.

FIG. 1 illustrates an embodiment according to the invention, including a two-phase motor 10 having input terminals 10A and 10B. A motor control circuit 11 includes a first halfbridge 12 and a second halfbridge 13 which provide input signals to motor 10. Halfbridge 12 contains N-channel MOSFETs M1 and M2 which are connected in a totem pole arrangement between a supply voltage $V_{CC}$ and ground. The common node between MOSFETs M1 and M2 delivers an output signal $V_{OUTA}$ to terminal 10A of motor 10. The gates of MOSFETs M1 and M2 are driven by signals on lines L1 and L2, respectively.

With reference to MOSFET M1, it will be noted that there is no source/body short. Instead the body is connected to a negative rail R2. Diodes D1A and D1B represent the drain/body and source/body junctions of MOSFET M1, respectively.

MOSFET M1 is connected between input terminal 10A and the supply voltage $V_{CC}$. In a similar manner, MOSFET M2 is connected between ground and input terminal 10A. The gate of MOSFET M2 is driven by a signal on a line L2. There is no source/body short in MOSFET M2, and its body is connected to rail R2. Diodes D2A and D2B represent the drain/body and source/body junctions of MOSFET M2, respectively.

Halfbridge 13 is connected in an identical manner to terminal 10B of motor 10. MOSFETs M3 and M4 are connected between Vcc and ground, with the common node between them coupled to terminal 10B. The body of each of MOSFETs M3 and M4 is connected to rail R2. Diodes D3A and D3B in MOSFET M3 and diodes D4A and D4B in MOSFET M4 represent the drain/body and source/body junctions of MOSFETs M3 and M4. The gates of MOSFETs M3 and M4 are driven by signals on lines L3 and L4, respectively. Halfbridge 13 delivers an output signal $V_{OUTB}$ to terminal 10B of motor 10.

Terminals 10A and 10B are connected via diodes D5A and D5B, respectively, to a positive rail R1. A capacitor C1 connects rail R1 to ground, in parallel with a Zener diode D6.

Rail R2 is connected to ground via a capacitor C2, which is in parallel with a Zener diode D7. Rail R2 is also connected to a grounding unit 14, which includes a depletion mode N-channel MOSFET M5, which has the customary source/body short. The source and gate terminals of MOSFET M5 are both connected to rail R2. A diode D8 represents the intrinsic "antiparallel" diode in MOSFET M5.

Lines L1–L4 are driven in a normal manner to provide the $V_{OUTA}$ and $V_{OUTB}$ signals to inputs 10A and 10B of motor 10. Signals on lines L1 and L4 turn MOSFETs M1 and M4 on simultaneously, while the signals on lines L2 and L3 turn MOSFETs M2 and M3 off. Terminal 10A is thus connected to $V_{CC}$ while terminal 10B is grounded. In the next half cycle, signals on lines L2 and L3 turn MOSFETs M2 and M3 on, while the signals on lines L1 and L4 turn MOSFETs M1 and M4 off. In this half cycle, terminal 10A is grounded while terminal 10B is connected to $V_{CC}$.

Figure 2A:
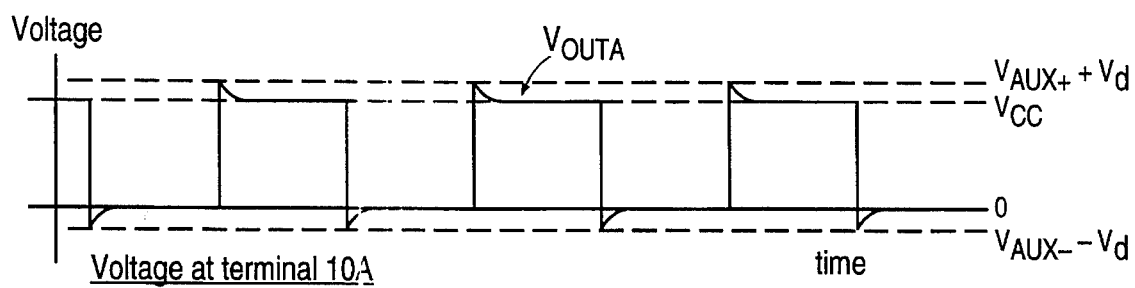
FIGS. 2A–2G illustrate the voltages at various points in the embodiment of FIG. 1.
Figure 2B:
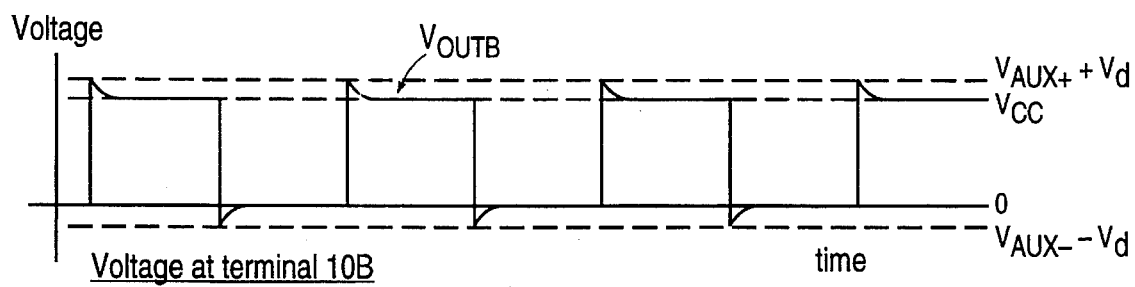
Figure 2C:
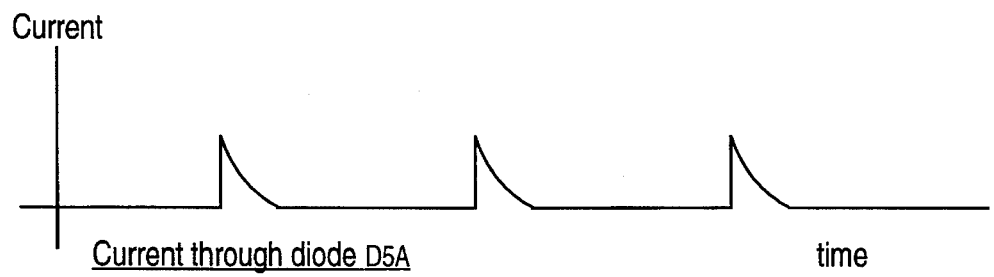
Figure 2D:

The waveforms of $V_{OUTA}$ and $V_{OUTB}$ are illustrated in FIGS. 2A and 2B, respectively, which show the positive and negative voltage spikes that are generated by the inductances in motor 10 whenever halfbridges 12 and 13 switch between their high and low output states. Each time one of terminals 10A and 10B goes high, the corresponding diode D5A or D5B is forward-biased, and a current flows through it to charge capacitor C1. The voltage spike which occurs whenever halfbridge 12 or 13 goes high is clamped by the forward biasing of diodes D5A and D5B to a voltage equal to $V_{AUX+}$ plus the voltage drop across the conducting diodes D5A and D5B, represented as a in FIGS. 2A and 2B. FIGS. 2C and 2D illustrate the current in diodes D5A and D5B, respectively, which charges capacitor C1 repetitively and incrementally. This process continues until capacitor C1 is charged to the breakdown voltage of Zener diode D6. This is represented in FIGS. 1 and 2 as $V_{AUX+}$, which is the steady-state voltage of the positive rail R1.

Figure 2E:
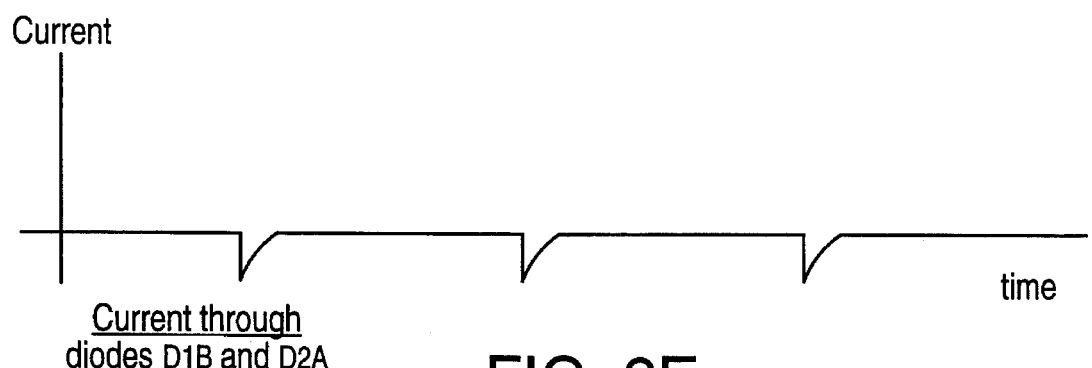
Figure 2F:
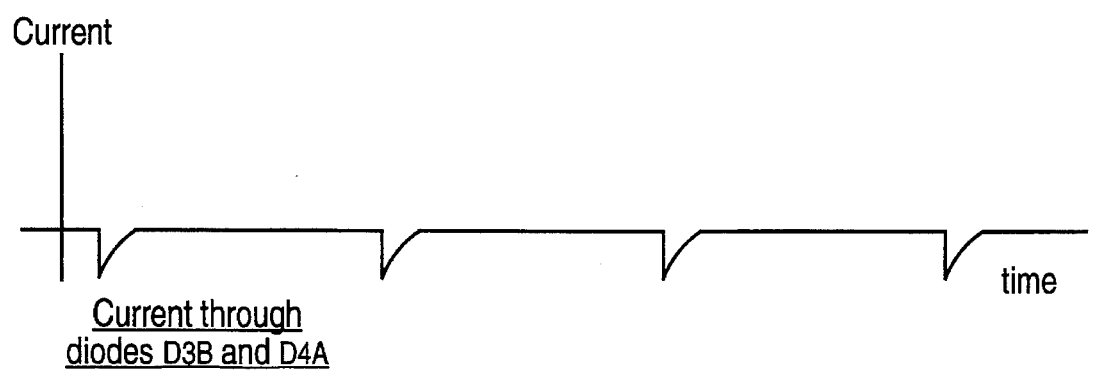

When terminal 10A goes low, diodes D1B and D2A are forward biased and current flows through them to produce a negative voltage on capacitor C2. When terminal 10B goes low, diodes D3B and D4A are forward biased, and capacitor C2 is driven further downward. The current in diodes D1B/D2A and diodes D3B/D4A which charge capacitor C2 repetitively and incrementally are illustrated in FIGS. 2E and 2F, respectively. This process continues until capacitor C2 is driven to the breakdown voltage of Zener diode D7. Thus $V_{AUX-}$, the steady-state voltage on the negative rail R2, is equal to the negative of the breakdown voltage of Zener diode D7.

Figure 2G:
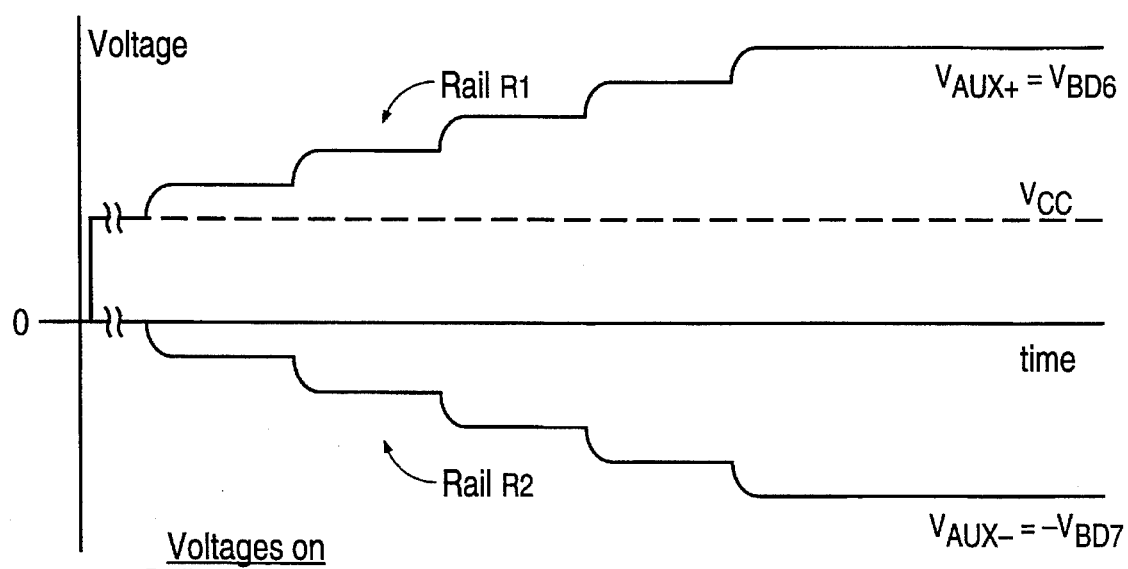

The voltages on the positive rail R1 and negative rail R2 as the system reaches steady state are illustrated in FIG. 2G. As shown, the voltage on rail R1 increases at the beginning of each half cycle until it reaches $V_{AUX+}$, which is equal to the breakdown voltage of Zener diode D6 ($V_{BD6}$). Conversely, the voltage on rail R2 decreases at the beginning of each half cycle until it reaches $V_{AUX-}$, which is the negative of the breakdown voltage of Zener diode D7 ($V_{BD7}$).

During startup, prior to the time when $V_{AUX-}$ is driven below ground, the voltage on rail R2 must be held near 0 volts. Otherwise, if the bodies of MOSFETs M2 and M4 are allowed to float, it may be difficult to get these MOSFETs to turn on and it is even possible that the intrinsic bipolar transistors in these MOSFETs would be turned on. The latter event would destroy the MOSFET.

The function of shorting unit 14 is to keep the voltage at rail R2 near ground during startup. Depletion mode MOSFET M5 acts as a resistor for small values of $V_{AUX-}$, and thereby performs a shorting function. As the magnitude of $V_{AUX-}$ falls, MOSFET M5 saturates and acts as a current limiter to minimize the current drain on the negative rail R2. Motor 10 must, however, continue to supply this current during the operation of the device.

Figure 3A:
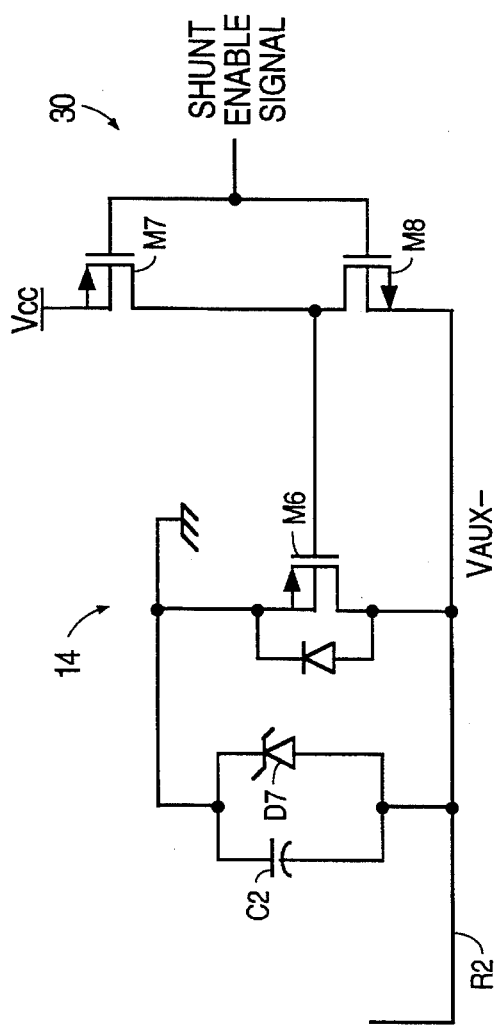
FIG. 3A illustrates an alternative circuit for the shorting unit using a CMOS inverter.
Figure 3B:
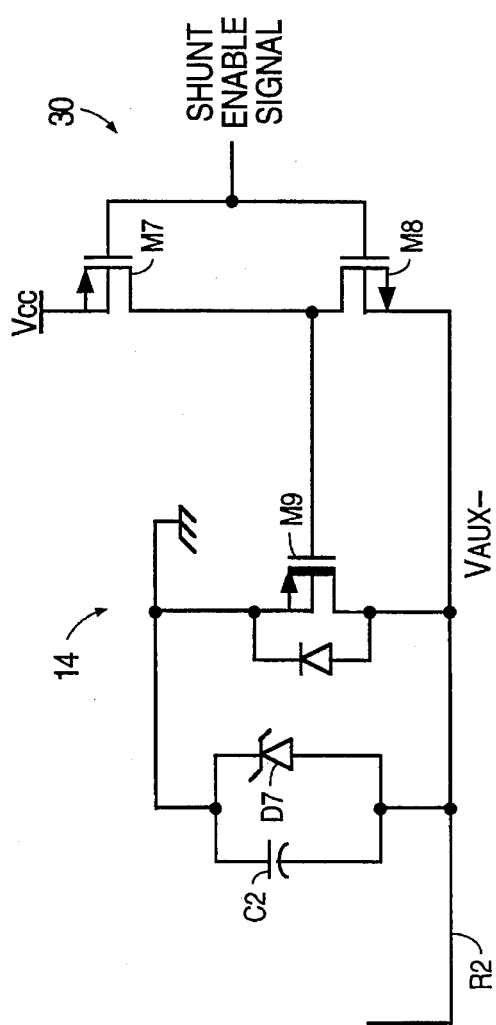
FIG. 3B illustrates another alternative circuit for the shorting unit using a depletion mode MOSFET.

Alternative circuitry for shorting unit 14 is illustrated in FIGS. 3A and 3B. In FIG. 3A, a P-channel MOSFET M6 is connected between rail R2 and ground. The gate of MOSFET M6 is connected to a CMOS inverter 30, which includes a P-channel MOSFET M7 and an N-channel MOSFET M8. At startup, MOSFET M6 is turned on and grounds rail R2. As the voltage on rail R2 begins to fall, a shunt disable signal is applied to the gates of MOSFETs M7 and M8, turning MOSFET M6 off and eliminating the undesirable current draw on negative rail R2. The shunt disable signal can be provided from any circuit signifying startup is complete such as a microprocessor, a timer or other comparator which switches startup after a predetermined voltage level is reached by $V_{CC}$, $V_{AUX+}$ or $V_{AUX-}$. The disadvantage of using enhancement mode MOSFET M6 with a gate to drain short (via MOSFET M8) is its high resistance and low current until its gate voltage exceeds 1 volt (i.e., its threshold voltage $V_t$) supplied from rail R2 via MOSFET M8.

In FIG. 3B, a depletion mode P-channel MOSFET M9 is connected between rail R2 and ground. Again, the gate of MOSFET M9 is controlled by inverter 30. The depletion mode MOSFET M9 is fully on during startup because its gate is tied to its drain via conducting MOSFET M8. As is known, depletion mode MOSFETs are turned on whenever the gate-to-source voltage $V_{GS}= 0$. After startup, gate 30 is instructed to switch states and supplies a gate voltage ($V_{CC}$) more positive than the source voltage (OV) of MOSFET M9, resulting in $V_{GS}<V_t$. In this situation, the depletion node MOSFET M9 becomes pinched off.

In summary, during startup $V_{GS}=$the drain-to-source voltage $V_{DS}=V_{AUX-}$ and MOSFET M9 is on (even when $V_{AUX-}$ is at zero volts), and after startup, $V_{GS}=+V_{CC}> V_t$ and MOSFET M9 is pinched off.

Figure 4:
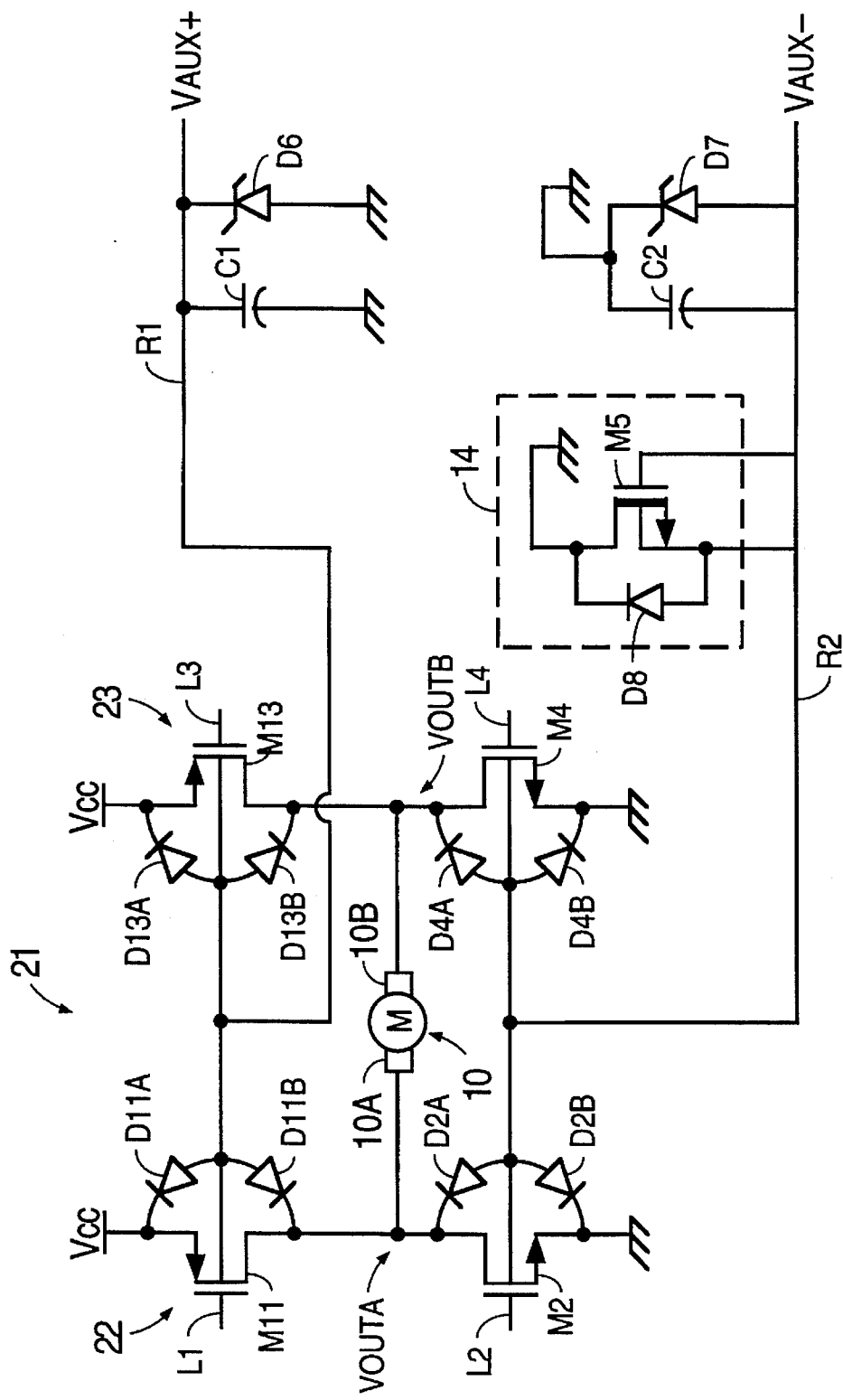
FIG. 4 illustrates an embodiment of the invention using P-channel MOSFETs on the high side of the halfbridges.

FIG. 4 illustrates an alternative embodiment in which P-channel MOSFETs are used as the high side MOSFETs in the halfbridges. Motor control circuit 21 is similar to motor control circuit 11 (FIG. 1) except that halfbridges 22 and 23 contain P-channel MOSFETs M11 and M13 in place of N-channel MOSFETs M1 and M3, respectively. The bodies of MOSFETs M11 and M13 are not shorted to the sources or to ground. Instead, they are coupled together and connected directly to the positive rail R1. Diodes D5A and D5B (FIG. 1) are omitted. Otherwise, the circuit elements are identical to those shown in FIG. 1. When $V_{OUTA}$ goes high, the intrinsic drain-body diode D11B in MOSFET M11 is forward-biased, and a current flows toward positive rail R1, charging capacitor C1. Similarly, when $V_{OUTB}$ makes a positive transition, diode D13B in MOSFET M13 is forward-biased, and capacitor C1 is further charged. The charge across capacitor C1 continues to increase in this manner until the breakdown voltage of Zener diode D6 is reached. Otherwise, the circuit shown in FIG. 4 operates similarly to the circuit shown in FIG. 1.

While the above embodiments describe a two-phase motor with two halfbridges, it will be apparent that the principles of this invention are applicable to three-phase motors or motors having any number of phases. In each instance, the output terminals of the motor are connected to the high side rail through a diode, and the bodies of the MOSFETs in each phase-bridge are connected to the low side rail.

The foregoing examples are intended to be illustrative and not limiting. Many alternative embodiments in accordance with this invention will be apparent to those skilled in the art. The broad principles of this invention are defined in the following claims.

What is claimed is:

1. A motor control circuit which provides positive and negative voltage rails, said motor control circuit comprising a first MOSFET and a second MOSFET connected in series, each of said first and second MOSFETs comprising a source region and a drain region formed within a body region, said body region not being shorted to either of said source or drain regions, a first common node between said MOSFETs being connected to a positive voltage rail, said body region of said second MOSFET being connected to a negative voltage rail.

2. The motor control circuit of claim 1 wherein said body region of said first MOSFET is also connected to said negative voltage rail.

3. The motor control circuit of claim 1 wherein a first diode is connected between said first common node and said positive voltage rail.

4. The motor control circuit of claim 1 wherein a first capacitor is connected between said positive voltage rail and ground, and a second capacitor is connected between said negative voltage rail and ground.

5. The motor control circuit of claim 4 comprising a first Zener diode in parallel with said first capacitor and a second Zener diode in parallel with said second capacitor.

6. The motor control circuit of claim 1 comprising a means for grounding said negative voltage rail during the startup of said motor control circuit.

7. The motor control circuit of claim 6 wherein said means comprises a depletion mode MOSFET connected between said negative voltage rail and ground.

8. The motor control circuit of claim 7 wherein a gate of said depletion mode MOSFET is connected to said negative voltage rail.

9. The motor control circuit of claim 6 wherein said means comprises a P-channel MOSFET connected between said negative voltage rail and ground, a gate of said P-channel MOSFET being connected to an inverter.

10. A combination comprising a two-phase motor and the motor control circuit of claim 1, said first common node being connected to a terminal of said motor.

11. A-combination comprising an N phase motor and the motor control circuit of claim 1, said first common node being connected to a terminal of said motor.

12. The motor control circuit of claim 1 further comprising a third MOSFET and a fourth MOSFET connected in series, each of said third and fourth MOSFETs comprising a source region and a drain region formed within a body region, said body region not being shorted to either of said source or drain regions, a second common node between said third and fourth MOSFETs being connected to said positive voltage rail, said body region of said fourth MOSFET being connected to a negative voltage rail.

13. The motor control circuit of claim 12 wherein said body region of said third MOSFET is also connected to said negative voltage rail.

14. The motor control circuit of claim 12 wherein a second diode is connected between said second common node and said positive voltage rail.

15. A method of electrically charging a positive voltage rail and a negative voltage rail, said method comprising the steps of:

providing an electric motor;

providing a motor control circuit, said motor control circuit being supplied by a supply voltage $V_{CC}$;

providing a capacitor having a terminal connected to said positive voltage rail;

passing positive voltage spikes generated by an inductance in said motor through a diode to charge said capacitor and thereby produce a positive voltage $V_{AUX+}$ on said positive voltage rail, wherein $V_{AUX+}$ is greater than $V_{CC}$.

16. The method of claim 15 wherein said motor control circuit comprises a MOSFET having a body region connected to a negative voltage rail, said method comprising the further step of passing negative voltage spikes from said motor into said body region to produce a negative voltage $V_{AUX-}$ on said negative voltage rail.

17. A motor control circuit which provides positive and negative voltage rails, said motor control circuit comprising a P-channel MOSFET and an N-channel MOSFET connected in series, each of said MOSFETs comprising a source region and a drain region formed within a body region, said body region not being shorted to either of said source or drain regions, a common node between said MOSFETs being for connection to a motor, said body region of said P-channel MOSFET being connected to said positive voltage rail, and said body region of said N-channel MOSFET being connected to said negative voltage rail.

18. The motor control circuit of claim 17 wherein a first capacitor is connected between said positive voltage rail and ground, and a second capacitor is connected between said negative voltage rail and ground.

19. The motor control circuit of claim 18 comprising a first Zener diode in parallel with said first capacitor and a second Zener diode in parallel with said second capacitor.

\* \* \* \* \*